United States Patent
Wath et al.

(10) Patent No.: US 9,803,349 B2
(45) Date of Patent: Oct. 31, 2017

(54) MECHANICAL AUTOMATIC URINAL-TOILET FLUSHER AND ITS MECHANISM THEREOF

(71) Applicant: COUNCIL OF SCIENTIFIC & INDUSTRIAL RESEARCH, New Delhi (IN)

(72) Inventors: Sushant Babarao Wath, Nagpur (IN); Pallampati Subrahmanya Dutt, Nagpur (IN); Satish Ramchandra Wate, Nagpur (IN)

(73) Assignee: COUNCIL OF SCIENTIFIC AND INDUSTRIAL RESEARCH, New Delhi (IN)

( * ) Notice: Subject to any disclaimer, the term of this patent is extended or adjusted under 35 U.S.C. 154(b) by 0 days.

(21) Appl. No.: 14/890,273

(22) PCT Filed: May 15, 2014

(86) PCT No.: PCT/IN2014/000329
§ 371 (c)(1),
(2) Date: Nov. 10, 2015

(87) PCT Pub. No.: WO2015/173832
PCT Pub. Date: Nov. 19, 2015

(65) Prior Publication Data
US 2017/0051484 A1    Feb. 23, 2017

(51) Int. Cl.
*E03D 5/02* (2006.01)
*E03D 5/08* (2006.01)
(Continued)

(52) U.S. Cl.
CPC ............. *E03D 5/022* (2013.01); *E03D 5/08* (2013.01); *E03D 13/00* (2013.01); *F16K 1/12* (2013.01);
(Continued)

(58) Field of Classification Search
CPC ........... A47K 11/02; E03D 5/022; E03D 5/08; E03D 13/005; F16K 1/12; F16K 27/0254; F16K 31/465
(Continued)

(56) References Cited

U.S. PATENT DOCUMENTS 1,564,122 A    12/1925    Campbell
3,995,327 A    12/1976    Hendrick
(Continued)

FOREIGN PATENT DOCUMENTS

| | | |
|---|---|---|
| CH | 260514 | 3/1949 |
| DE | 462417 | 7/1928 |
| DE | 462517 | 7/1928 |

*Primary Examiner* — Janie Loeppke
(74) *Attorney, Agent, or Firm* — Baker and Hostetler LLP

(57) ABSTRACT

This invention relates to a system for facilitating an automatic urinal toilet flushing comprising: a pipe (P) having an intermediate enlarged inner diameter area, said pipe comprising: first portion $P_1$ having a first diameter $d_1$; second portion $P_2$ having a second diameter $d_2$; a third portion $P_3$ having a third diameter $d_3$; wherein the first, the second and the third portions are sequential and the diameter $d_2$ is greater than diameter $d_1$ and diameter $d_3$; a tapered forth portion $P_4$ connecting the first portion $P_1$ to the second portion $P_2$; and a tapered fifth portion $P_5$ connecting the second portion $P_2$ to the third portion $P_3$; a valve mechanism located within the pipe (P), the said valve mechanism comprising an inlet dual valve (1), an outlet dual valve (2) and a connecting rod connecting the inlet dual valve (1) and outlet dual valve (2); and an actuating mechanism that gets automatically actuated and upon actuation, operates the valve mechanism to perform a flushing operation.

11 Claims, 3 Drawing Sheets

(51) Int. Cl.
 *E03D 13/00* (2006.01)
 *F16K 1/12* (2006.01)
 *F16K 27/02* (2006.01)
 *F16K 31/46* (2006.01)

(52) U.S. Cl.
 CPC ........ *F16K 27/0254* (2013.01); *F16K 31/465* (2013.01)

(58) Field of Classification Search
 USPC .......................................................... 222/453
 See application file for complete search history.

(56) References Cited

U.S. PATENT DOCUMENTS

| | | | |
|---|---|---|---|
| 4,007,499 A | | 2/1977 | Lin |
| 4,607,766 A | * | 8/1986 | Jones .................... G01F 11/021 |
| | | | 222/386.5 |
| 7,302,713 B1 | * | 12/2007 | Bhatt ........................ E03D 5/08 |
| | | | 251/295 |

* cited by examiner

MECHANICAL AUTOMATIC URINAL-TOILET FLUSHER AND ITS MECHANISM THEREOF

REFERENCE TO RELATED APPLICATIONS

This application is a National Stage of International Application No. PCT/IN2014/000329, filed on May 15, 2015, the disclosure of which is incorporated by reference in its entirety.

FIELD OF THE INVENTION

The present invention relates to a mechanical automatic urinal-toilet flusher and its mechanism thereof.

Particularly, this invention relates to a mechanical automatic urinal-toilet flusher and its mechanism thereof for enabling a user to automatically flush urinal-toilet regularly and un-intentionally with a measured or specified quantity of water to improve reliability and maintainability, and to reduce offensive odours in the urinal-toilets.

More particularly, this invention relates to use of the weight load/pressure of the person using the Urinal-toilet for automatic operating of the flush without having any direct hand contact.

BACKGROUND OF INVENTION AND PRIOR ART DETAILS

A series of urinal-toilets are fitted in offices, malls, multiplexes, institutions, schools, colleges, bus stands, railway stations, air ports, commercial complexes, stadia and other public places for public use. Most of the urinals-toilets have manual flushing systems like push button, trigger, pull chain, etc. Now a day's laser or infrared sensor operated flushes is also used in the places of high commercial value and importance like shopping malls, airports, multiplexes, etc.

In general public places sometimes do stink and un-clean urinals-toilets are the common observations which make the user of these urinals-toilets to avoid its uses, or to use it reluctantly in case of urgency. The reasons of not flushing the urinals-toilets and its limitations may be many, for example:
 1. Un-availability of water.
 2. Non-operational flush/system.
 3. Manually operated and Tap fitted urinal-toilet may lead to wastage of water, as person using doesn't bother to make extra effort to close the tap/knob fitted in the wall. Faulty tap may leads to continuous wastage of water.
 4. Ignorance and lethargy for flushing urinal-toilets on the user parts, even in case of pushbutton or trigger type flushes.
 5. High-tech flushing system using infrared/laser sensing devises is expensive and require regular maintenance and operational expenses, which cannot be affordable in all cases. And may be stolen or damaged in various cases of public toilets where no supervision is available.
 6. It is a known fact that the public urinal-toilets are unhygienic and replete with germs, and so are flush handles, which gets transferred to the person who touches the flush handle. In addition many people who use a public urinals-toilets flush do not wash their hands prior to leaving, which results in spreading the germs to doorknobs and other objects, such as the paper dispensers, soap dispensers, etc. Therefore it is desirable and expected by the user of urinal-toilets to automatic-regular-compulsory and un-intentionally flushing without his/her any direct hand contact.

Public awareness of personal hygiene and water conservation issues over the last several years has caused manufacturers of sanitary facility and hygiene devices to develop automatic actuators for sanitary facilities such as toilets and urinals. One purpose of such devices is to automatically control the amount of flush water used to eliminate waste and in the process eliminate human contact with the surfaces that may contain disease spreading bacteria. Most of the present day toilets and urinal flush devices for sanitary facilities are operated by a water control valve which includes a manually operable flush handle adapted to be gripped and moved by a user. However, those manually operated valve actuation devices have many problems for e.g. use of such manually operated flush can lead to diseases thus users avoid to touch/use the flush button. Therefore, the sanitary facility may remain un-flushed which increases the unsanitary conditions, and fouling the atmosphere in the facility. Also, a large volume of water is wasted every time a user flushes a standard toilet. Hence, there is a need for an automatic flushing apparatus which can flush the right amount of water and avoid any need of human contact with the surface of urinal-toilet thus achieving the advantage of conserving water as well as maintaining personal hygiene. At the same time is low cost and affordable to all in terms of its maintenance and operation.

A flush urinal-toilet is a urinal-toilet that disposes of human waste by using water to flush it through a drainpipe to another location.

The bibliographic data of each of the relevant documents has been presented below with appropriate comments indicating the similarity of the cited prior art with the present invention. The closest prior art to the present invention is given below:

Reference may be made to Patent DE462517, 1928 entitled "Abtrittspülvorrichtung with flushing valve and flushing water from flowing through the piston cylinder, through which, under the pressure of the flushing water by means of a knit of the seat is folded up aengeuebertragung" wherein Abtrittspülvonichtung with purge valve and one of the flushing water flowing through piston cylinder, through which, under the pressure of the rinse water, by means of a linkage of the seat transfer is folded is described. The invention relates to an Abtrittspülvor device with flush valve and one of the flushing water flowing through the piston cylinder, by which under the pressure of rinse water by means of a folded linkage the seat. This patent discloses an automatic flusher with piston-cylinder arrangement connected to the toilet seat via spring. The cylinder has an inlet and drain port, the piston moved down in the cylinder from the top inlet port which opens to below the drain opening port in cylinder for automatic flushing of water in toilet bowl. The patent doesn't disclose the dual-valve pipe mechanism for automatic flushing of water.

Reference may be made to U.S. Pat. No. 4,007,499A, 1977 wherein a "Commode flushing control apparatus" is described. Control apparatus used in connection with commodes automatically moves a trip lever for flushing the commode and includes a member adapted to be connected to the trip lever for moving between an initial position and a flushing position to cause the trip lever to raise a drain valve to its open position. A spring moves the member to its flushing position, and a person-operated device causes energy to be stored in the spring and releases subsequently the energy from the spring to move the member toward its flushing position. A latching device connected to the member connects releasable the member and the trip member for moving it and the valve against the force of water pressure acting on the valve until the water pressure equals the force applied by the spring after sufficient water discharge. As a result, the spring commences again to move the member after the sufficient water discharge has taken place to release the latching device so that the member becomes free of the trip lever and the flushing mechanism can complete its normal flushing operation. This patent discloses a body weight operated flushing mechanism. In this mechanism, when a person sits on the toilet seat or stands on a platform located near the toilet a rod gets rotated to move a lever which lifts the floating drain valve to flush water from the water tank. The cited invention does not disclose the dual-valve pipe activation mechanism.

The cited documents (U.S. Pat. No. 4,007,499A and DE462517A) disclose automatic float valve type toilet flusher but none of them reveal the mechanism used for controlling the flow and drainage of water by using dual-valve pipe mechanism as disclosed in present invention. Also, no prior art document has been retrieved which mentioned the use of a device or an attachment which can be connected in line with the pipe through which water flows into the toilet or urinal.

However, there are many automatic flusher in prior art relates to use of the weight load/pressure of the person using the Urinal-toilet for automatic operating of the flush without having any direct hand contact but the present invention discloses an automatic flusher with dual-valve pipe mechanism actuated by a mechanical platform. The pipe consists of bulged portion acting as a temporary water reservoir with the cross section of inlet and outlet of the pipe in conformance with the shape mutually connected inlet and outlet Dual-valves. These Valves move simultaneously to control the flow of water in to or out of the temporary water reservoir in response to the use of platform for automatic flushing of water in urinal.

A novel design and construction is proposed to develop a dual-valve fitted flush system with a mechanical platform, which can be fitted-retrofitted to any water pipe used for flushing the urinal-toilet, by automatically depositing a specified or measured quantity/volume of water in to the flush system for flushing the urinal-toilets after uses.

OBJECTS OF THE INVENTION

The main object of the present invention is to provide a Mechanical Automatic Urinal-Toilet Flusher with dual-valve pipe and its Mechanism thereof which obviates the draw backs of the hitherto known prior art as detailed above.

Another object of the present invention is to design and develop a spring loaded dual-valve fitted flush system connected with a mechanical platform fitted with compression springs, which can be fitted or retrofitted to pipe use for flushing the urinal.

Yet another object of the present invention is to provide a means for enabling a user to automatically flush urinal-toilet compulsorily, regularly and un-intentionally with a measured or specified quantity of water to improve reliability and maintainability, and to reduce offensive odours in the urinal-toilets.

Still another object of the present invention is to use the weight load/pressure of the person using the Urinal-toilet for automatic operating of the flush without having any direct hand contact.

Yet another object of the present invention is to provide an Automatic Urinal-Toilet flusher which can be readily installed and efficient to use and low cost.

SUMMARY OF THE INVENTION

Accordingly, the present invention provides a system for facilitating an automatic urinal toilet flushing comprising pipe (P) having an intermediate enlarged inner diameter area, said pipe comprising a first portion $P_1$ having a first diameter $d_1$, a second portion $P_2$ having a second diameter $d_2$; a third portion $P_3$ having a third diameter $d_3$; wherein the first, the second and the third portions are sequential and the diameter $d_2$ is greater than diameter $d_1$ and diameter $d_3$, a tapered forth portion $P_4$ connecting the first portion $P_1$ to the second portion $P_2$; and a tapered fifth portion $P_5$ connecting the second portion $P_2$ to the third portion $P_3$; a valve mechanism located within the pipe (P), the said valve mechanism comprising an inlet dual valve (1), an outlet dual valve (2) and a connecting rod connecting the inlet dual valve (1) and outlet dual valve (2); and an actuating mechanism that gets automatically actuated and upon actuation, operates the valve mechanism to perform a flushing operation.

In an embodiment of the invention, the actuating mechanism operates the inlet and outlet dual valves such that when the inlet dual valve is in a closed position, the outlet dual valve is maintained in an open position and vice-versa.

Alternatively, a second embodiment of the invention the inlet dual valve comprises a first and a second portion, with the second portion comprising a tapered diameter.

Alternatively, a third embodiment of the invention the closed position the first and second portion of the inlet dual valve co-operates with the first and the forth portions $P_1$ and $P_4$ of the pipe, respectively.

Alternatively, a fourth embodiment of the invention the outlet dual valve comprises a first and a second portion, with the second portion comprising a tapered diameter.

Alternatively, a fifth embodiment of the invention the closed position the first and second portion of the outlet dual valve co-operates with the third and the fifth portions $P_3$ and $P_5$ of the pipe, respectively.

Alternatively, a sixth embodiment of the invention, the actuating mechanism comprises a mechanical platform (10) which compresses under the weight of person; and a connecting cable (8) adapted to connect both the dual-valve with a mechanical platform (10).

Alternatively, a seventh embodiment of the invention the mechanical platform is mounted upon a base in a movable manner, and separated from and base by a set of resilient means, such that upon actuation the mechanical platform moves closer to the base.

Alternatively, an eighth embodiment of the invention the base is provided with a set of motion limiting structures so as to maintain a minimum distance between the base and the mechanical platform.

Alternatively, a ninth embodiment of the invention a resilient means (7) adapted to retain in its normal position the inlet dual-valve in the closed position and the outlet dual-valve in the open position.

Alternatively, a tenth embodiment of the invention, the third portion $P_3$ of the pipe is adopted to hold a predetermined quantity of water therein for flushing purposes.

Alternatively, a eleventh embodiment of the invention, the inlet dual valve comprises a resilient sealing means disposed between the first and a second portion.

Alternatively, a twelfth embodiment of the invention, the outlet dual valve comprises a resilient sealing means disposed between the first and a second portion.

DETAILED DESCRIPTION OF THE INVENTION

The core of system comprises of a specially designed dual-valve pipe mechanism actuated by a mechanical platform supported by a platform spring. The pipe comprises of a bulging structure which acts as a temporary water reservoir. The bulge consists of an inlet and an outlet valve. The mechanical platform is connected to the valve assembly via a cable and a tension spring mechanism.

Figure 1:
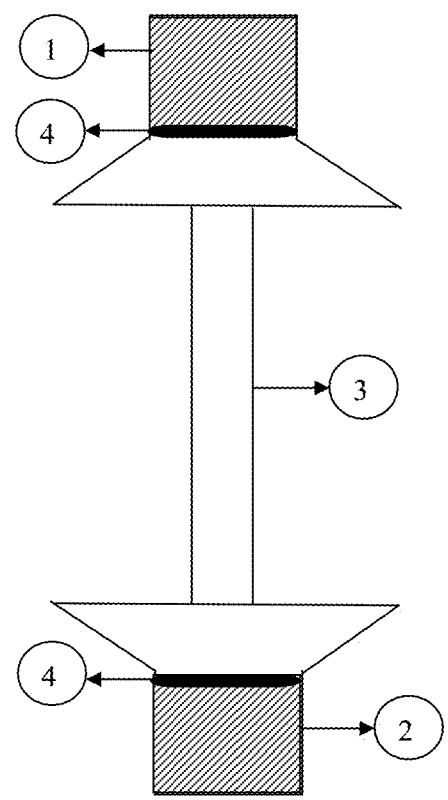
FIG. 1 shows the sectional view of the Dual-Valve
FIG. 2 show the cross sectional view of the Temporary Water Reservoir.

The invention, both as its organization and method of operation, thereof will best be understood by reference to the following detailed description taken in connection with the accompanying sheet of drawings, wherein:

Reference is now made to the FIG. 1, comprises a specially designed and developed Dual-Valve 1 and 2 made up of varying materials like Aluminium, Wood, Fibre, Polymer, Plastic, Iron, Rubber or any other material, preferably water resistant and durable material of varying sizes and shapes like round, rectangular, square, oval, conical, cylindrical, etc. The Dual-Valve 1 and 2 are connected together with a Connecting Rod 3 made up of varying materials like Aluminium, Wood, Fibre, Polymer, Plastic, Iron, Rubber or any other material, preferably water resistant durable material of varying sizes and shapes like round, rectangular, square, conical, cylindrical, etc. A 'O' ring or 'Gasket' 4 is fitted on the Dual-Valve surface, which will restrict the water leakage in the urinal-toilet.

Figure 2:
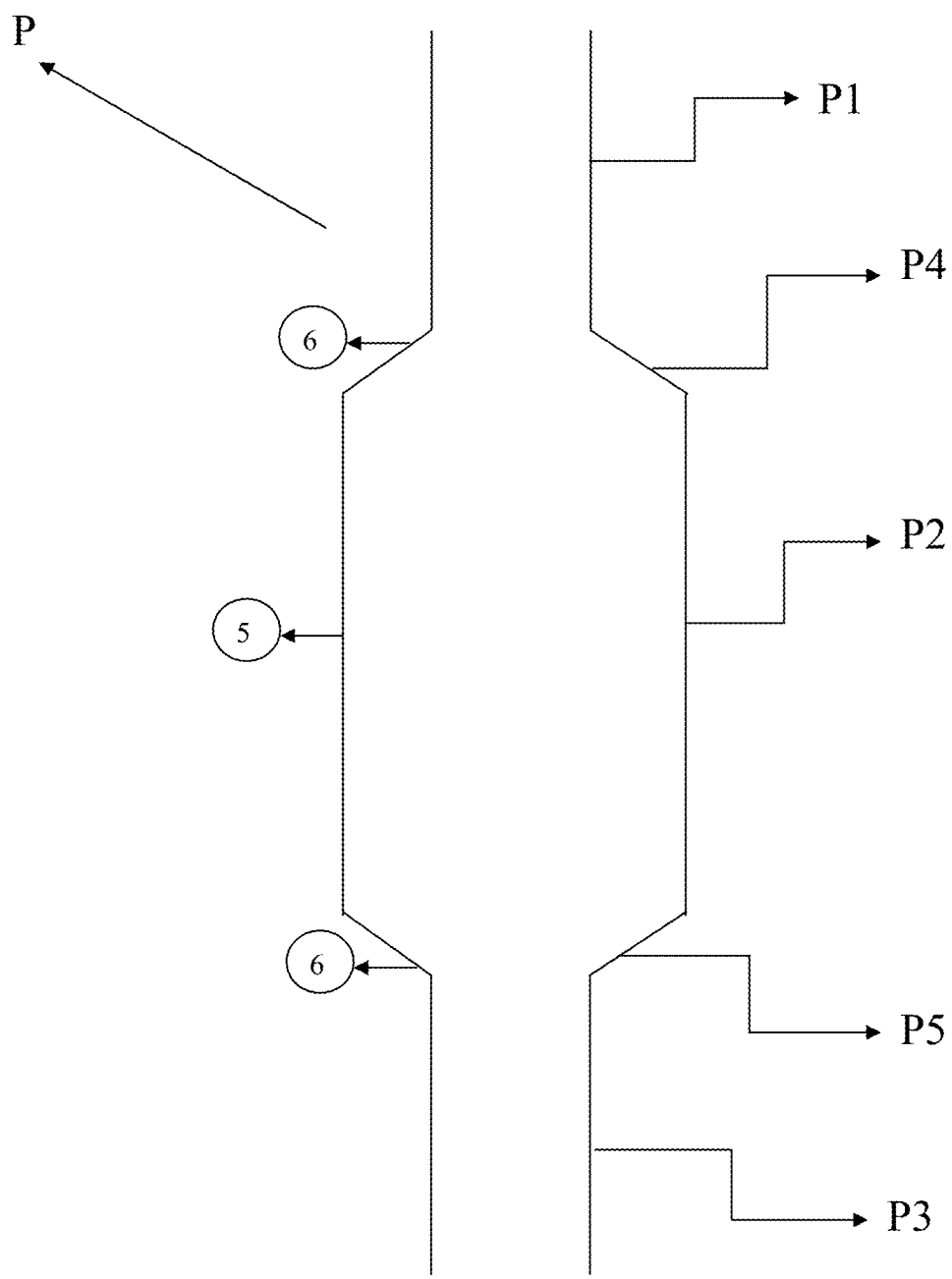

Reference is now made to the FIG. 2. It defines a pipe (P) having an intermediate enlarged inner diameter area, pipe comprising a first portion $P_1$ having a first diameter $d_1$, a second portion $P_2$ having a second diameter $d_2$; a third portion $P_3$ having a third diameter $d_3$; where the first, the second and the third portions are sequential and the diameter $d_2$ is greater than diameter $d_1$ and diameter $d_3$, a tapered forth portion $P_4$ connecting the first portion $P_1$ to the second portion $P_2$; and a tapered fifth portion $P_5$ connecting the second portion $P_2$ to the third portion $P_3$. A Temporary Water Reservoir 5 which is made up of varying materials like Aluminium, Wood, Fibre, Polymer, Plastic, Iron, Ceramic, or any other material, preferably water resistant durable material of varying sizes and shapes such as round, rectangular, square, oval, conical, etc. preferably of cylindrical shape. The Concentric Reducers or tapers 6 are fitted at both ends to the Temporary Water Reservoir 5 which is connected in-line with the water pipe through which water flows into the Urinal-toilet.

Figure 3:
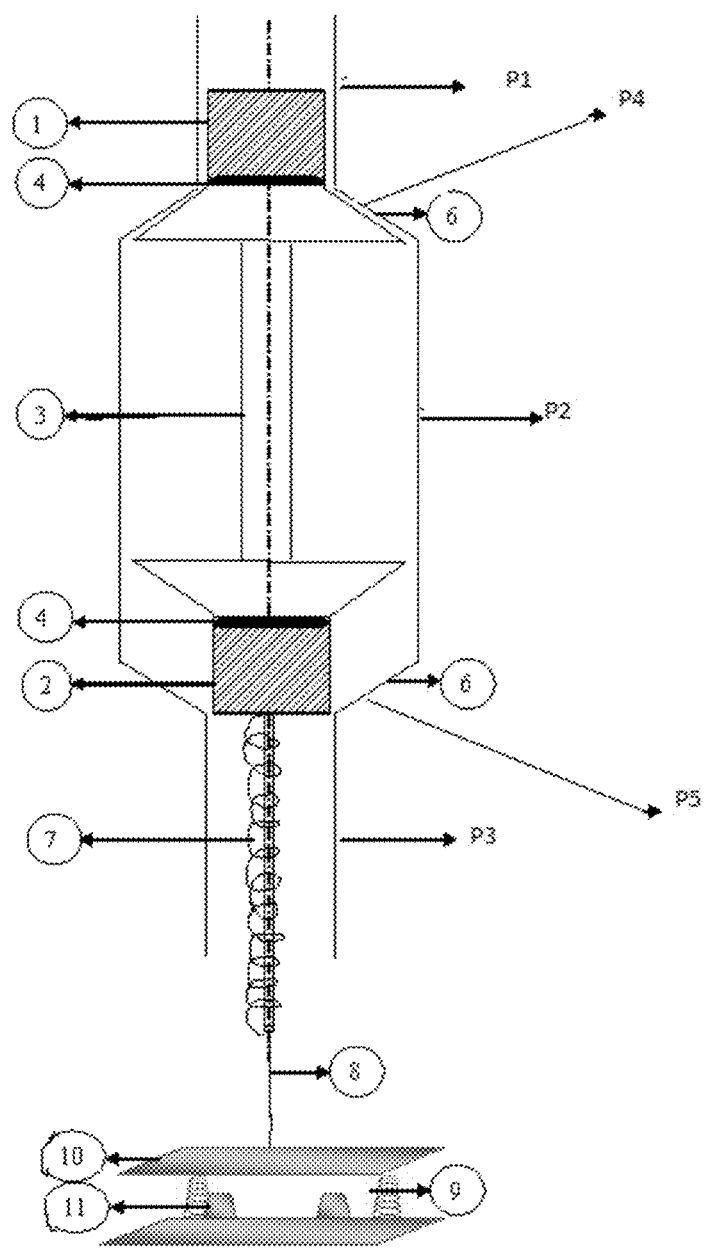
FIG. 3 shows the sectional view of the present invention, the Mechanical Automatic Urinal-Toilet Flusher connected to the mechanical platform fitted with compression springs.

Reference is now made to the FIG. 3, it defines a valve mechanism located within the pipe (P), the said valve mechanism comprising an inlet dual valve (1), an outlet dual valve (2) and a connecting rod connecting the inlet dual valve (1) and outlet dual valve (2); and an actuating mechanism that gets automatically actuated and upon actuation, operates the valve mechanism to perform a flushing operation. It shows the complete assembly of the present invention which comprises of a specially designed and developed Dual-Valve 1 and 2 made up of varying materials like Aluminium, Wood, Fibre, Polymer, Plastic, Iron, Rubber or any other material, preferably water resistant durable material of varying sizes and shapes like round, rectangular, square, oval, conical, cylindrical, etc. The Dual-Valve 1 and 2 are connected together with a Connecting Rod 3 made up of varying materials like Aluminium, Wood, Fibre, Polymer, Plastic, Iron, Rubber or any other material, preferably water resistant durable material of varying sizes and shapes like round, rectangular, square, conical, cylindrical, etc. The 'O' ring or Gasket 4 is fitted at the interface of the Dual-Valves and the Concentric Reducers 6 which will restrict the water leakage between the interface of Dual-Valves 1 and 2 and the Concentric Reducers 6. The Concentric Reducers 6 are fitted at both ends to the Temporary Water Reservoir 5 which is made up of varying materials like Aluminium, Wood, Fibre, Polymer, Plastic, Iron, Rubber or any other material, preferably water resistant durable material of varying sizes and shapes like round, rectangular, square, oval, conical, etc. preferably cylindrical shape. The Dual-Valve 2 is fitted with the Tension spring/resilient means 7 of varying size depending on the requirements, which enables the Dual-Valve 1 in normally closed position, while Dual-Valve 2 in normally open position. The Dual-Valve 1 and 2 is connected by Cable 8 to the Platform 10 made up of Aluminium, Wood, Fibre, Polymer, Plastic, Iron, Rubber or any other material, preferably water resistant durable material of varying sizes and shapes like round, rectangular, oval, square, etc., fitted with a Compression Springs 9 of varying sizes depending on the requirement. The Platform 10 is also fitted with a Platform Movement Restrictor 11 made up of varying materials like Aluminium, Wood, Fibre, Polymer, Plastic, Iron, Rubber or any other material, preferably water resistant durable material of varying sizes and shapes like round, rectangular, square, oval, conical, cylindrical, etc. which restricts the compression movement of the platform to the pre-set/pre-decided value in order to avoid any damage to the Dual-Valve assembly due to extensive compression or movement of the platform and or Dual-Valve.

Functioning

The present invention describes a device or an attachment which can be fitted to pipe for automatic flushing of the urinal-toilet. According to the disclosure and FIG. 1, 2, 3 provided, it can be described as an automatic toilet flushing device with a spring actuated platform by virtue of the weight load/pressure of the user and ensuring a regular, compulsory and un-intentional flushing of the Urinal-Toilet. In the normal condition the inlet Dual-valve 1 is in the closed position and the outlet Dual-Valve 2 is in the open position. The motion of both the valves is in synchronization with each other, i.e. when one valve closes the other opens and vice-versa.

The Mechanical Platform 10 compresses under the weight of a person when a person stands on it. This movement of the platform activates the spring mechanism. The compression spring 9 gets compressed up to the pre-decided/pre-set movement, as restricted by the Movement Restrictor 11. The downward motion of the platform 10 pulls the Cable 8 creating a tension in the Tension Spring 7 and thereby displacing the Dual-valves 1 and 2 from their normal positions. The downward motion causes the inlet Dual-Valve 1 to open and outlet Dual-Valve 2 to close simultaneously. When the inlet Dual-valve 1 opens, the water fills in the Temporary Reservoir 5 from the water pipe. After the person leaves the Platform 10, the Compression Springs 9 decompresses and the platform 10 rises back to its normal state. During the upward rise of the platform 10 the tension in the Tension Spring 7 releases due to which the inlet Dual-Valve 1 closes and outlet Dual-Valve 2 opens i.e. the valves regain their normal position. This opening of outlet Dual-Valve 2 flushes the water to the urinal-toilet.

The present invention discloses an automatic flusher with dual-valve pipe mechanism actuated by a mechanical platform which utilizes the weight or pressure of the person using the urinal-toilet for automatic flushing the urinal or toilet with the specified or measured quantity of water. The pipe consists of bulged portion acting as a temporary water reservoir with the cross section of inlet and outlet of the pipe in conformance with the shape mutually connected inlet and outlet specially designed float-valve fitted flushers system normally closed for automatically holding and releasing the specific or measured quantity of water in to the urinal after use. These floats move simultaneously to control the flow of water in to or out of the temporary water reservoir in response to the use of spring fitted platform for automatic flushing of water in urinal.

The search and analysis study revealed that both of the closest cited documents (U.S. Pat. No. 4,007,499A and DE462517A) disclose automatic float valve type toilet flusher but none of them reveal the technology used for controlling the flow and drainage of water by using dual-valve pipe mechanism as disclosed in present invention. Also, no prior art document has been retrieved which mentioned the use of a device or an attachment which can be connected in line with the pipe through which water flows into the urinal-toilet.

The flush is operated by the spring fitted mechanical platform without the use of any laser or infrared sensor or any other electrical of electronic device. The construction is simple, low cost and easy.

ADVANTAGES

The main advantages of the invention are:
No need for manual knob/trigger pushing or electronic/electrical operation.
Low cost and cheaper.
Simple and easy to construct and can also be retrofitted to existing urinals-toilets with some modification.
Easy and Low Maintenance.
Maintenance cost is negligible.
Operation is automatic and without any intention/efforts.
No wastage of water.
Leads to regular and compulsory flushing and cleaning of toilets/urinals.
Assured regular flushing.

We claim:

1. A system for facilitating an automatic urinal toilet flushing comprising:
a pipe (P) connected to a water reservoir on a first end and a urinal toilet at a second end and having an intermediate enlarged inner diameter area, said pipe comprising:
a first portion $P_1$ having a first diameter $d_1$;
a second portion $P_2$ having a second diameter $d_2$;
a third portion $P_3$ having a third diameter $d_3$; wherein the first, the second and the third portions are sequential and the diameter $d_2$ is greater than diameter $d_1$ and diameter $d_3$;
a tapered fourth portion $P_4$ connecting the first portion $P_1$ to the second portion $P_2$; and
a tapered fifth portion $P_5$ connecting the second portion $P_2$ to the third portion $P_3$;
a valve mechanism located within the pipe (P), the said valve mechanism comprising an inlet dual valve (1), an outlet dual valve (2) and a connecting rod connecting the inlet dual valve (1) and outlet dual valve (2); and
an actuating mechanism for operating the valve mechanism to perform a flushing operation, the actuating mechanism comprising:
a mechanical platform (10) mounted upon a base in a movable manner, and separated from the base by a set of resilient means, such that the mechanical platform moves closer to the base under weight of person; and
a connecting cable (8) adapted to connect both the dual-valve with the mechanical platform (10).

2. The system for facilitating automatic urinal toilet flushing as claimed in claim 1, wherein the actuating mechanism operates the inlet and outlet dual valves such that when the inlet dual valve is in a closed position, the outlet dual valve is maintained in an open position and vice-versa.

3. The system for facilitating automatic urinal toilet flushing as claimed in claim 2, wherein in the closed position the first and second portion of the inlet dual valve co-operates with the first and the fourth portions $P_1$ and $P_4$ of the pipe, respectively.

4. The system for facilitating automatic urinal toilet flushing as claimed in claim 2, wherein in the closed position the first and second portion of the outlet dual valve co-operates with the third and the fifth portions $P_3$ and $P_5$ of the pipe, respectively.

5. The system for facilitating automatic urinal toilet flushing as claimed in claim 1, wherein the inlet dual valve comprises a first and a second portion, with the second portion comprising a tapered diameter.

6. The system for facilitating automatic urinal toilet flushing as claimed in claim 5, wherein the inlet dual valve comprises a resilient sealing means disposed between the first and a second portion.

7. The system for facilitating automatic urinal toilet flushing as claimed in claim 1, wherein the outlet dual valve comprises a first and a second portion, with the second portion comprising a tapered diameter.

8. The system for facilitating automatic urinal toilet flushing as claimed in claim 7, wherein the outlet dual valve comprises a resilient sealing means disposed between the first and a second portion.

9. The system for facilitating automatic urinal toilet flushing as claimed in claim 1, wherein the base is provided with a set of motion limiting structures so as to maintain a minimum distance between the base and the mechanical platform.

10. The system for facilitating automatic urinal toilet flushing as claimed in claim 1, further comprising a resilient means (7) adapted to retain in its normal position the inlet dual-valve in the closed position and the outlet dual-valve in the open position.

11. The system for facilitating automatic urinal toilet flushing as claimed in claim 1, wherein the third portion $P_3$ of the pipe is adopted to hold a predetermined quantity of water therein for flushing purposes.

* * * * *